(Model.) 2 Sheets—Sheet 2.

J. T. WALKER.
FRUIT AND VEGETABLE CUTTER.

No. 273,201. Patented Feb. 27, 1883.

WITNESSES
Edwin L. Jewell
N. A. Toulmin

INVENTOR
James T. Walker.
C. M. Alexander.
ATTORNEY

N. PETERS, Photo-Lithographer, Washington, D. C.

UNITED STATES PATENT OFFICE.

JAMES T. WALKER, OF TROY, NEW YORK.

FRUIT AND VEGETABLE CUTTER.

SPECIFICATION forming part of Letters Patent No. 273,201, dated February 27, 1883.

Application filed August, 5 1882. (Model.)

*To all whom it may concern:*

Be it known that I, JAMES T. WALKER, of Troy, in the county of Rensselaer, and in the State of New York, have invented certain new and useful Improvements in Fruit and Vegetable Cutters; and I do hereby declare that the following is a full, clear, and exact description thereof, reference being had to the accompanying drawings, and to the letters of reference marked thereon, making a part of this specification.

This invention relates to certain improvements in machines for slicing or cutting fruits and vegetables of various descriptions, but it is specially designed for slicing pine-apples; and it consists in a peculiar arrangement of a series of knives and a series of tangential rotary followers or arms, by means of which the fruits are drawn along the knives, so as to give a long draw cut and carry the slices, as they are cut, between the knives and deliver them below the same, as more fully hereinafter specified.

In order that the advance or improvement which I have made in the class of machines to which this invention has reference may more readily appear, I desire to state that to my knowledge curved followers for pressing the fruit against the knives have been used. I am further informed of the fact that knives which radiate from a common center have been used. The chief objection arising from such construction may be briefly stated to consist in the tendency of the fruit to work radially from the followers, and in the crowding and bruising to which the fruit has been subjected by reason of the means employed, in the instances referred to, for overcoming the said radiation tendency of the fruit—namely, the curvature of the followers. As a further objection, I may state that the arrangement of the blades which radiate from a common center is such as to prevent a free and unobstructed lateral spreading of the slices, the result of which is injury to the fruit and loss of juice.

Figure 1:
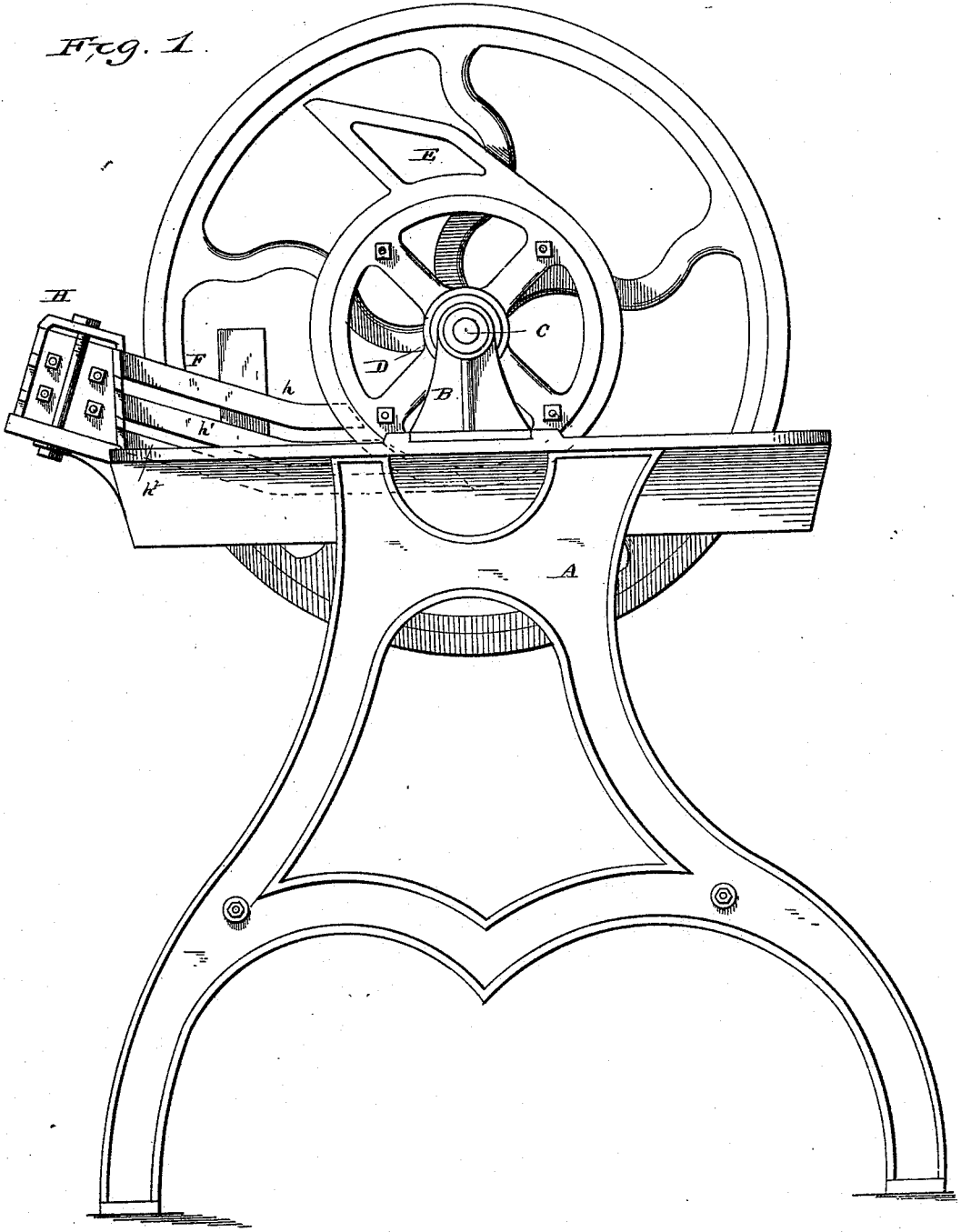
Figure 2:
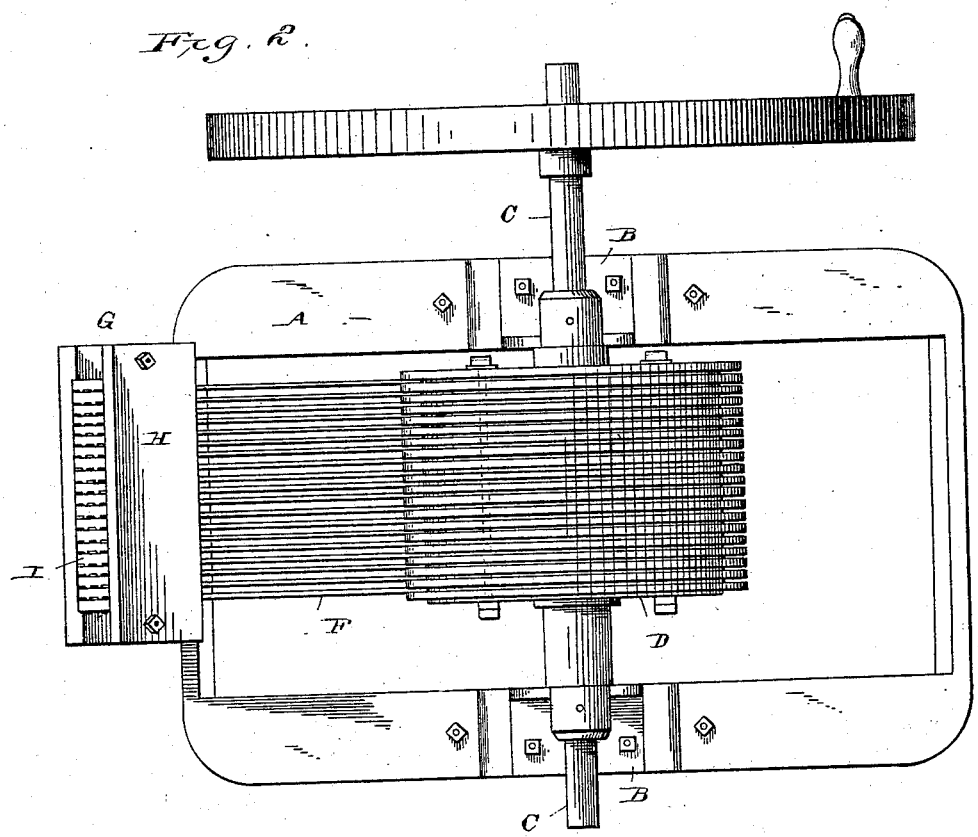
Figures 3, 4:
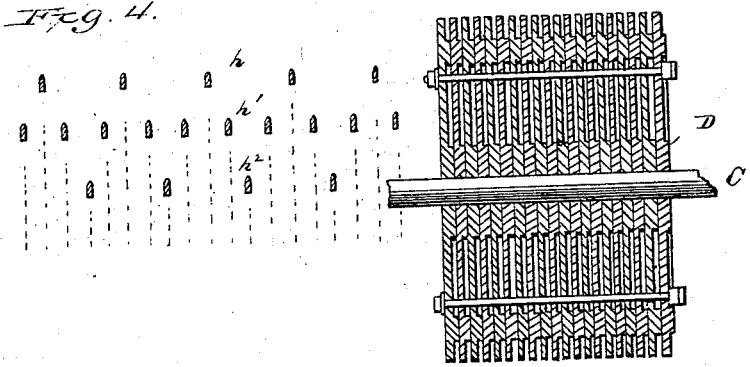

In the accompanying drawings, Figure 1 represents a side elevation of my improved apparatus. Fig. 2 represents a top view of the same. Fig. 3 represents a sectional view of the rotary followers by means of which the fruits or vegetables are drawn upon and carried between the knives; and Fig. 4 represents a transverse sectional view, showing the arrangement of the knives.

The letter A indicates a metallic frame which supports the working parts of my apparatus. On the upper part of this frame are secured two pillow-blocks, B, which form journal-bearings for a transverse shaft, C, to which is secured a series of followers, D, which are keyed, clamped, or otherwise secured to the shaft. These followers consist of a series of metallic rings having suitable spokes, which are attached to the shaft, the rings being set with suitable spaces between them, as and for the purpose hereinafter explained.

The rings are provided with arms E, which extend outwardly from their peripheries, which are adapted to seize the fruit, draw it along the knives, and pass it between them. For this purpose, and in order to give a long draw cut, the edges of the arms which bear against the fruit are extended obliquely from the peripheries of the rings in such manner as to crowd the fruit or vegetables along the knives toward the rings.

The knives F consist of bent blades of steel, their forward portions being arranged at an angle to the bed of the machine, their rear ends being parallel, or nearly so, thereto. The forward ends of the knives are confined to a suitable bed forming part of the frame, (indicated by the letter G,) and a plate, H, suitable plates, I, being interposed between the knives in order to space them. The knives are arranged in series, occupying two or more successive planes, $h\ h'\ h^2$. The knives of the upper series are arranged at such distances apart as to cut comparatively thick slices. The next series below are arranged so that two knives fall in lines directly below, between the upper series, and the lowest series are arranged so as to fall in line directly between and below the last-mentioned series, as indicated in Fig. 4 of the drawings, for the purpose hereinafter mentioned.

The shaft on which the followers are mounted is elevated somewhat above the bed of the machine, in order to bring the arms into proper position to force the fruit toward the center of said followers.

The followers and their arms are arranged to work between the knives when rotated. Their first effect is to draw the fruit lengthwise along the upper series of knives, cutting it into slices the width of the spaces between the said knives. These slices are then forced downward, as they are cut, upon the series next below, where each slice is again divided by means of a pair of the series of next lower knives. These knives, by their position, permit the slices, at their sides, to spread out so as to clear the knives, the central slices cut by said knives passing directly downward to the lowest series, the fruit being in this manner cut into uniform slices without being crushed or bruised.

The knives, with their intervening plates, which are bolted together by means of transverse screws, may be taken out all together by loosening the top plate which confines the head composed of the plates and knives, and by loosening the transverse bolts any one knife may be removed.

Having thus described my invention, what I claim, and desire to secure by Letters Patent, is—

1. The combination, with a shaft having a series of rings provided each with a tangential arm, of two or more independent series of knives, the knives of each series being differently spaced relatively to the next series, and each series collectively being parallel to the remaining series, the center of rotation of said arms being in a different plane from the knives, whereby the fruit is swept and carried along and through the knives and lateral displacement allowed the slices, substantially as set forth.

2. The combination, in a fruit and vegetable cutter, of a shaft having a series of rings provided each with a tangential arm, with two or more independent series of knives, located in a different plane from the shaft, whereby a sweeping tendency is given the fruit along the knives as the same is being sliced.

In testimony whereof I affix my signature, in presence of two witnesses, this 4th day of August, 1882.

JAMES T. WALKER.

Witnesses:
J. J. McCARTHY,
CHAS. D. DAVIS.